US008244253B2

(12) United States Patent
Choi et al.

(10) Patent No.: US 8,244,253 B2
(45) Date of Patent: Aug. 14, 2012

(54) METHOD AND APPARATUS FOR SUPPORTING FAST MOBILITY IP WITH LINK IDENTIFIER PREFIX IN WIRELESS COMMUNICATION SYSTEM

(75) Inventors: Jin-Jyeock Choi, Yongin-si (KR);
Subba Reddy Kota, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 991 days.

(21) Appl. No.: 11/581,349

(22) Filed: Oct. 17, 2006

(65) Prior Publication Data
US 2007/0097921 A1    May 3, 2007

Related U.S. Application Data

(60) Provisional application No. 60/732,646, filed on Nov. 3, 2005.

(30) Foreign Application Priority Data

May 17, 2006    (KR) .................. 10-2006-0044439

(51) Int. Cl.
*H04W 36/00* (2009.01)
(52) U.S. Cl. ........ 455/438; 455/436; 455/403; 370/328; 370/338
(58) Field of Classification Search .................. 455/436, 455/432.1, 437, 439, 440, 524, 525, 443, 455/442, 452, 438, 441, 444; 380/277; 370/338, 370/349, 334, 331–332, 328
See application file for complete search history.

(56) References Cited

U.S. PATENT DOCUMENTS

| 2001/0015965 A1* | 8/2001 | Preston et al. ................ 370/338 |
| 2003/0016655 A1* | 1/2003 | Gwon ........................... 370/352 |
| 2003/0087646 A1* | 5/2003 | Funato et al. ................. 455/456 |
| 2003/0091021 A1* | 5/2003 | Trossen et al. ............... 370/349 |
| 2004/0092264 A1  | 5/2004 | Koodli et al. |
| 2004/0156347 A1* | 8/2004 | Kim .............................. 370/338 |
| 2004/0205211 A1* | 10/2004 | Takeda et al. ................ 709/230 |

(Continued)

FOREIGN PATENT DOCUMENTS
KR    2004-70891    8/2004
(Continued)

OTHER PUBLICATIONS

Lee, An enhanced uplink scheduling algorithm based on voice activity for VoIP services in IEEE 802.16d/e system, Aug. 2005, IEEE). http://ieeexplore.ieee.org/stamp/stamp.jsp?tp=&arnumber=1496584&isnumber=32148.*

(Continued)

*Primary Examiner* — Kamran Afshar
*Assistant Examiner* — Marisol Fahnert
(74) *Attorney, Agent, or Firm* — NSIP Law

(57) ABSTRACT

A method and apparatus for supporting a fast mobility Internet Protocol (IP) with a link identifier prefix (LinkID prefix) in a wireless communication system are provided. According to a method for performing a handoff from a first access router to a second access router, a Layer 2 (L2) beacon containing a link identifier prefix is sent to a mobile node in the second access router. The first access router establishes a tunneling with the second router, as the mobile node sends a Fast Binding Update (FBU) message including a care-of address (CoA) which the mobile node dynamically constructs using the link identifier prefix, to the first access router.

33 Claims, 9 Drawing Sheets

U.S. PATENT DOCUMENTS

| | | | |
|---|---|---|---|
| 2004/0253954 A1* | 12/2004 | Lee et al. ................ | 455/436 |
| 2005/0047372 A1 | 3/2005 | Yano et al. | |
| 2005/0163080 A1* | 7/2005 | Suh et al. ................ | 370/331 |
| 2005/0180355 A1* | 8/2005 | Kim et al. ................ | 370/328 |
| 2005/0255847 A1* | 11/2005 | Han et al. ................ | 455/436 |
| 2006/0099950 A1* | 5/2006 | Klein et al. ............... | 455/439 |
| 2006/0140177 A1* | 6/2006 | Karhu ...................... | 370/356 |
| 2006/0187873 A1* | 8/2006 | Friday et al. ............. | 370/328 |

FOREIGN PATENT DOCUMENTS

| | | |
|---|---|---|
| KR | 2005-37370 | 4/2005 |
| KR | 2005-91611 | 9/2005 |
| WO | WO 2005/043839 | 5/2005 |
| WO | WO 2005/046144 | 5/2005 |
| WO | WO 2005-062580 | 7/2005 |
| WO | WO 2005/086503 | 9/2005 |

OTHER PUBLICATIONS

Introduction to L3 Movement Detection and L3 Link Identifier, Xiaoyu Liu, Samsung AIT, May 2004, http://www.ieee802.org/21/doctree/2004_Meeting_Docs/2004-07_meeting_docs/21-04-0071-00-0000-802_MIHS_minutes_2004_05_13.doc.*

Fast Handovers for Mobile IPv6, Sebastien Auvray, Tsunami Project, France Telecom, Eurescom, 2002, http://www.eurescom.de/~public-web-deliverables/P1100-series/P1113/D1/pdfs/pir41/41_mip_fh.pdf.*

Koodi, Fast Handovers for Mobile IPv6, Nokia Research Center Network Working Group, Jul. 2005 http://www.ietf.org/rfc/rfc4068.txt.*

Eunsoo Shim, Mobility Management in the Wireless Internet, Mar. 19, 2004.

IETF Mobile IP working group Internet draft (Mobile support in IPv6): draft-ietf-mobileip-ipv6-24.txt (Jun. 2003) See the I. introduction and V.4 mobile prefix discovery.

"Link-layer support for fast mobile IPv6 handover in wireless LAN based networks", Jordan, N.; Poropatich, A.; Fleck, R.; Local and Metropolitan Area Networks, 2004. LANMAN 2004. The 13$^{th}$ IEEE Workshop on, Apr. 25-28, 2004 pp. 139-143.

"Enhanced layer-3 handover using the layer-2 triggers", Seung Hun Oh; Young Han Kim; Jong Hwa Lee; Wireless Pervasive Computing, 2006 1$^{st}$ International Symposium on, Jan. 16-18, 2006 p. 3 pp.

* cited by examiner

PRESET CANDIDATE ACCESS ROUTER TABLE

FIG. 6

DYNAMIC ACCESS ROUTER TABLE

| AP1 | LINKID1 | AR1 | PREFIX1(A) |
|-----|---------|-----|------------|
| AP2 | LINKID2 | AR2 | PREFIX2(B) |
| AP3 | LINKID3 | AR2 | PREFIX2(B) |
|     |         |     |            |

⋮

METHOD AND APPARATUS FOR SUPPORTING FAST MOBILITY IP WITH LINK IDENTIFIER PREFIX IN WIRELESS COMMUNICATION SYSTEM

CROSS-REFERENCE TO RELATED APPLICATIONS

This application claims the benefit under 35 U.S.C. §119 (e) of U.S. Provisional Application No. 60/732,646, filed on Nov. 3, 2005, in the U.S. Patent and Trademark Office, and under 35 U.S.C. §119(a) of Korean Patent Application No. 10-2006-0044439, filed on May 17, 2006, in the Korean Intellectual Property Office, the entire contents of which are hereby incorporated by reference.

BACKGROUND OF THE INVENTION

1. Field of the Invention

The present invention relates to a wireless communication system. More particularly, the present invention relates to a method and apparatus for improving fast mobility Internet Protocol version 6 (FMIPv6) with a link identifier prefix (LinkID prefix) in a portable Internet system according to the Institute of Electrical and Electronics Engineers (IEEE) 802.16d/e, wireless broadband Internet (WiBro), and World Interoperability for Microwave Access (WiMAX), among others.

2. Description of Related Art

A fourth generation mobile communication unifies systems, such as IEEE 802.16d/e, WiBro, and WiMax, among others. In the fourth generation mobile communication, satellite networks, wireless networks, digital broadcasting networks, and video broadcasting networks are unified into a single network and systematically interoperate with each other. Accordingly, a user may utilize a communication service such as a portable Internet in a preferred state, with any network.

FIG. 1 is a diagram illustrating a conventional wireless communication system 100 environment. Referring to FIG. 1, mobile nodes (MN) may receive a communication service, such as a call, digital broadcasting, and downloading or uploading of digital medial data, among others, via access points (APs). The APs and an access router (AR) are connected to each other, based on an Ethernet. A routed Internet Protocol (IP) via a control of the AR is sent or received to/from a destination node or a destination server via a corresponding AP.

In FIG. 1, the AP functions as a bridge for a fast connection to the MN. Also, the AP functions to process scheduling of wireless resources and a radio frequency (RF) control function. The AR is an IP terminating point which is mainly in charge of a Layer 3 (L3), and routes IP packets so that the IP packets may be appropriately sent and received between the APs and the MNs. The AR interoperates with a home agent (HA) which performs a mobile IP registration allocation and a data encapsulation. The HA is connected to the AR via an IP core network including an IP public access network. In addition, an Authentication/Authority/Accounting (AAA) server, a quality manager, a location register, and an application server, among others, may be connected to the AR via the IP core network.

In the conventional wireless communication system 100 environment, the AR may support mobility of nodes according to FMIPv6 which is advanced IPv6. Fast handoff by FMIPv6 is disclosed in RFC4068. To support an IP as described above, the AR manages a candidate access router (CAR) table as shown in FIG. 2.

When a MN moves from a service area of a first AP (AP1) of a subnet where a first AR (AR1) covers, to a service area of a second AP (AP2) of a subnet where a second AR (AR2) covers, in an environment as shown in FIG. 1, an access point Media Access Control (AP MAC) address or a Basic Service Set Identifier (BSSID) may be acquired by scanning an L2 beacon. Accordingly, the MN inserts the BSSID into a Proxy Router Solicitation (PRS) message, and sends the message to a previous AR. For example, the message may be sent to the AR1 illustrated in FIG. 2, to acquire information about a new AR, for example, the AR2 shown in FIG. 2.

The previous AR, for example, the AR1, inserts information, for example, PREFIX 2 of FIG. 2, about the new AR, for example, the AR2, into the PRS message and thereby generates an advertisement. Accordingly, the MN constructs a new care-of address (NCoA), and sends a predetermined binding message to the previous AR which is the AR1. According to an exemplary implementation, the binding message consists of the NCoA and the BSSID. The MN receives a predetermined acknowledgement (Ack) message from the previous AR, for example, the AR1, according to the binding message. The previous AR, for example, the AR1, transfers IP packets of an L3 to the new AR, for example, the AR2.

Therefore, when the MN moves to the subnet of the AR2 and sends a predetermined advertisement message to communicate with the AP2, the new AR (AR2) receives the advertisement message from the previous AR (AR1) and sends buffered IP packets to the MN. As described above, when performing a handoff from the subnet of the AR1 to the subnet of the AR2, a significant amount of signaling occurs among MNs, APs, and ARs.

In a conventional handoff method, an L3 handoff, such as a subnet change, may not be directly determined from information which is contained in an L2 beacon. Accordingly, when the AP1 and the AP2 belong to an identical subnet which is connected to an identical AR, the L3 handoff is also performed in the conventional handoff method. Accordingly, unnecessary signaling still occurs between the MN and the AP1, between the MN and the AR1, and between the AR1 and the AR2. Also, in the conventional handoff method, there is a disadvantage of overhead that prefixes corresponding to the APs and the ARs must be preset in the candidate access router (CAR) table, as shown in FIG. 2, to support a handoff.

Accordingly, there is a need for an improved system and method for performing a handoff by dynamically constructing an access router table ARs according to a link identifier prefix that a MN receives from any of the ARs, and thereby detecting an appropriate AP.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide a method of performing a handoff. An access router table of access routers (ARs) is dynamically constructed according to a link identifier prefix that a mobile node (MN) receives from any of the ARs. An appropriate access point (AP) is subsequently detected.

An aspect of exemplary embodiments of the present invention provides a routing apparatus of a wireless communication system which can insert a link identifier prefix into a Layer 2 (L2) beacon and thereby, facilitate the ability of an MN or an AR to dynamically acquire information necessary for handoff.

According to an aspect of exemplary embodiments of the present invention, there is provided a method for performing a handoff from a first access router to a second access router in a wireless communication system. A Layer 2 (L2) beacon containing a link identifier prefix is sent to a mobile node in the second access router. The first access router establishes a tunneling with the second router, as the mobile node sends a Fast Binding Update (FBU) message including a care-of address (CoA) to the first access router, wherein the mobile node dynamically constructs the CoA using the link identifier prefix.

According to an exemplary implementation, the Fast Binding Update (FBU) message includes a Basic Service Set Identifier (BSSID) which is acquired from the link identifier prefix and the L2 beacon.

According to another aspect of exemplary embodiments of the present invention, there is provided a mobile detection method of a mobile node in a wireless communication system. A Layer 2 (L2) beacon comprising a link identifier prefix which is sent from an access router is received and a determination is made as to whether an L3 handoff is performed, according to the link identifier prefix.

According to another exemplary implementation, the L3 handoff is performed when the link identifier prefix is a changed value, and the L3 handoff is not performed when the link identifier prefix is not the changed value.

According to yet another exemplary implementation, the mobile node (MN) receives a plurality of L2 beacons, selects an access point which has sent an L2 beacon containing a link identifier prefix, extracted from the plurality of L2 beacons, identical to a maintained link identifier prefix in a previous communication, and communicates with the selected access point.

According to still another aspect of exemplary embodiments of the present invention, there is provided a routing apparatus for performing a handoff of a mobile node in a wireless communication system. The routing apparatus includes a first access router and a second access router. When the second access router sends an L2 beacon including a link identifier prefix to the mobile node, the mobile node dynamically constructs a CoA using the link identifier prefix and sends an FBU message including the CoA to the first access router, and the first access router establishes a tunneling with the second access router according to the FBU message.

Other objects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other exemplary objects, features and advantages of certain exemplary embodiments of the present invention will be more apparent from the following description taken in conjunction with the accompanying drawings, in which:

FIG. 6 is a diagram illustrating a dynamic access router table according to an exemplary embodiment of the present invention;

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
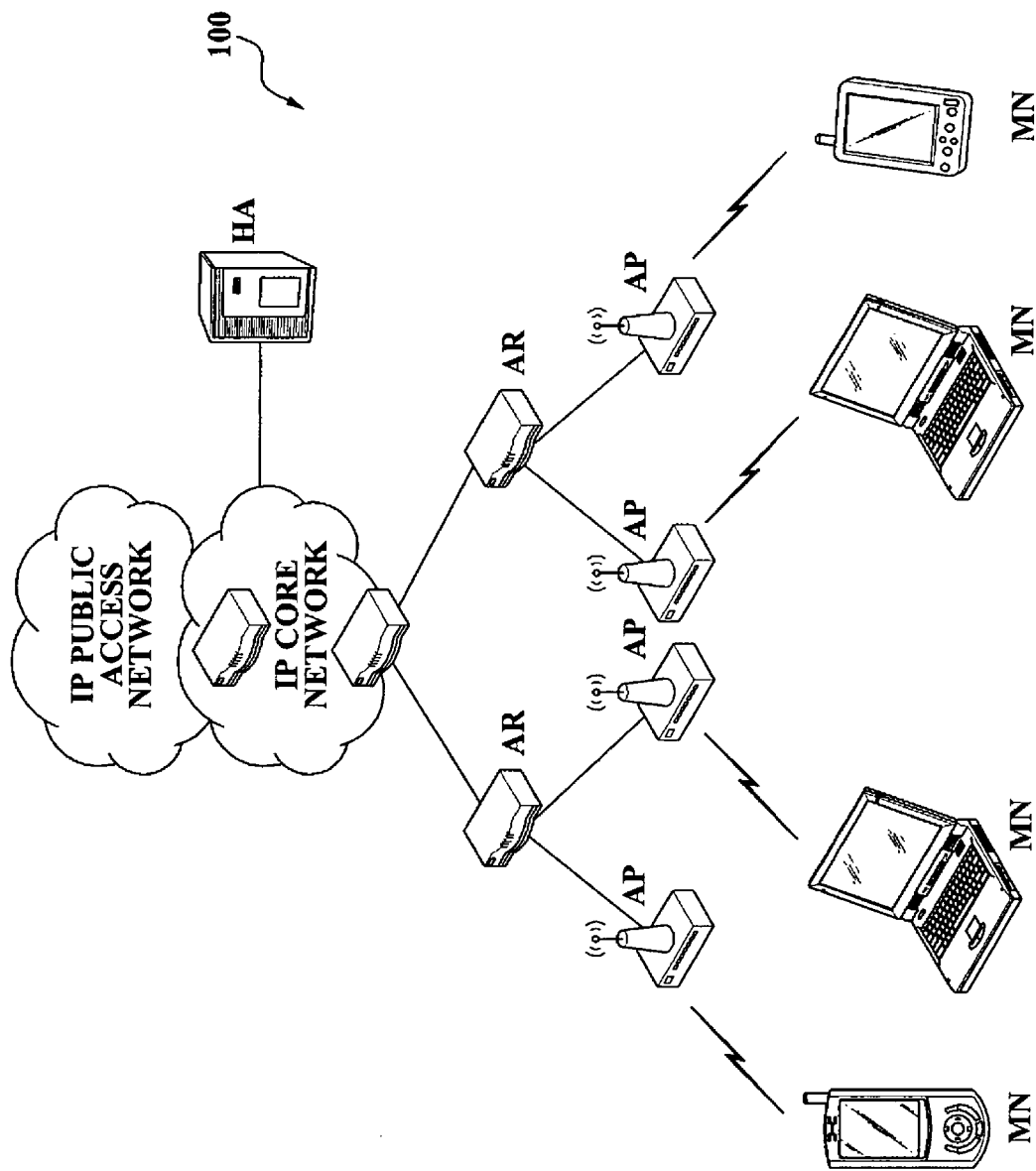
FIG. 1 is a diagram illustrating a conventional wireless communication system environment.
Figure 2:
FIG. 2 is a diagram illustrating a conventional candidate access router table.
Figure 3:
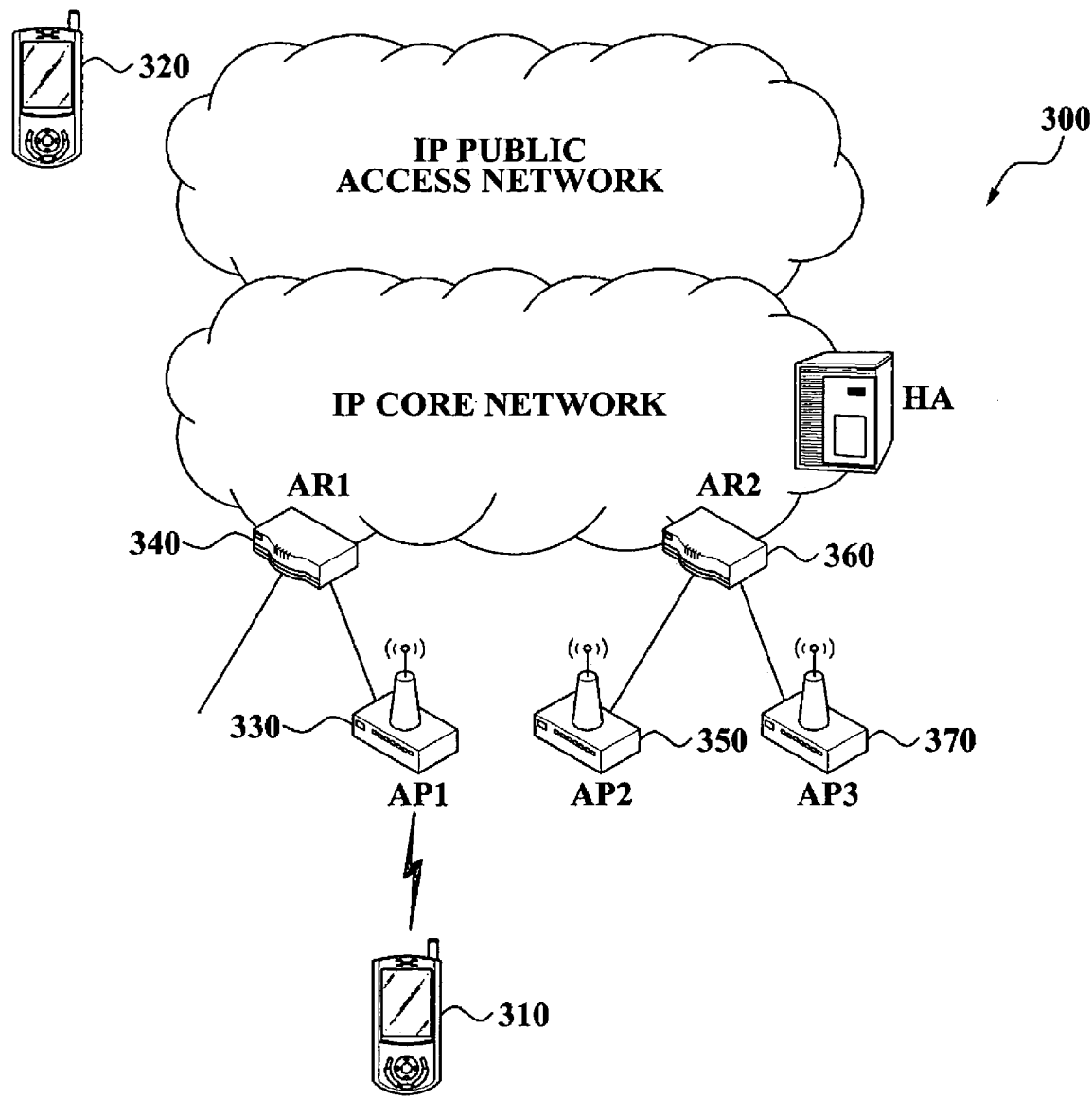
FIG. 3 is a diagram illustrating a wireless communication system according to an exemplary embodiment of the present invention.

FIG. 3 is a diagram illustrating a wireless communication system 300 according to an exemplary embodiment of the present invention. Referring to FIG. 3, the wireless communication system 300 includes a first node 310, a second node 320, a first access point (AP) 330, a first access router (AR) 340, a second AP 350, a second AR 360, and a third AP 370.

According to an exemplary implementation, the first node 310 and the second node 320 are assumed to be mobile stations or hosts such as a mobile phone, a notebook computer, and a personal digital assistant (PDA), among others. The first node 310 communicates with a correspondent node, the second node 320, via the first AP 330, the second AP 350, and the third AP 370, and the first AR 340 and the second AR 360, which are connected to an Internet Protocol (IP) core network. Here, the IP core network includes a private access network and a public access network. The wireless communication system 300 may be applied to a fourth generation mobile Internet system which supports fast mobility Internet Protocol version 6 (FMIPv6) according to the Institute of Electrical and Electronics Engineers (IEEE) 802.16d/e, wireless broadband Internet (WiBro), and World Interoperability for Microwave Access (WiMAX), among others.

The first AP 330, the second AP 350, and the third AP 370 perform a Radio Resource Control (RRC) function according to scheduling of wireless resources and a handoff function supporting mobility between cells, and thereby, relays a communication between the first node 310 and the second node 320.

The first AR 340 and the second AR 360 control a session connection establishment of an incoming call. Also, the first AR 340 and the second AR 360 manage routing so that an Internet Protocol (IP) packet or a message between each of the first node 310 and the second node 320, and each of the first AP 330, the second AP 350, and the third AP 370 may be appropriately sent and received.

The first AR 340 and the second AR 360 may interoperate with a home agent (HA), which performs a mobile IP registration allocation and a data encapsulation function. In addition, an Authentication/Authority/Accounting (AAA) server, a quality manager, a location register, and an application server, among others, may be connected to the first AR 340 and the second AR 360 via the IP core network.

In the wireless communication system 300, the first AR 340 and the second AR 360 may support seamless mobility between the first node 310 and the second node 320 according to FMIPv6. Specifically, the first AR 340 and the second AR 360 are constructed to insert and send a link identifier (LinkID) prefix in a Layer 2 (L2) beacon. Accordingly, the first node 310 and the second node 320, or the neighboring first AR 340 and the second AR 360, reduce unnecessary signaling and thereby, facilitate their ability to dynamically acquire information necessary for handoff. Specifically, even when an entry of prefix mapping information corresponding to an AP and an AR is not included in an access router table which are managed by the first AR 340 and the second AR 360, the first node 310 and the second node 320 may send the LinkID prefix which is received from the first AR 340 and the second AR 360, and thereby, the first AR 340 and the second AR 360 dynamically add a new entry to the access router table.

Figure 4:
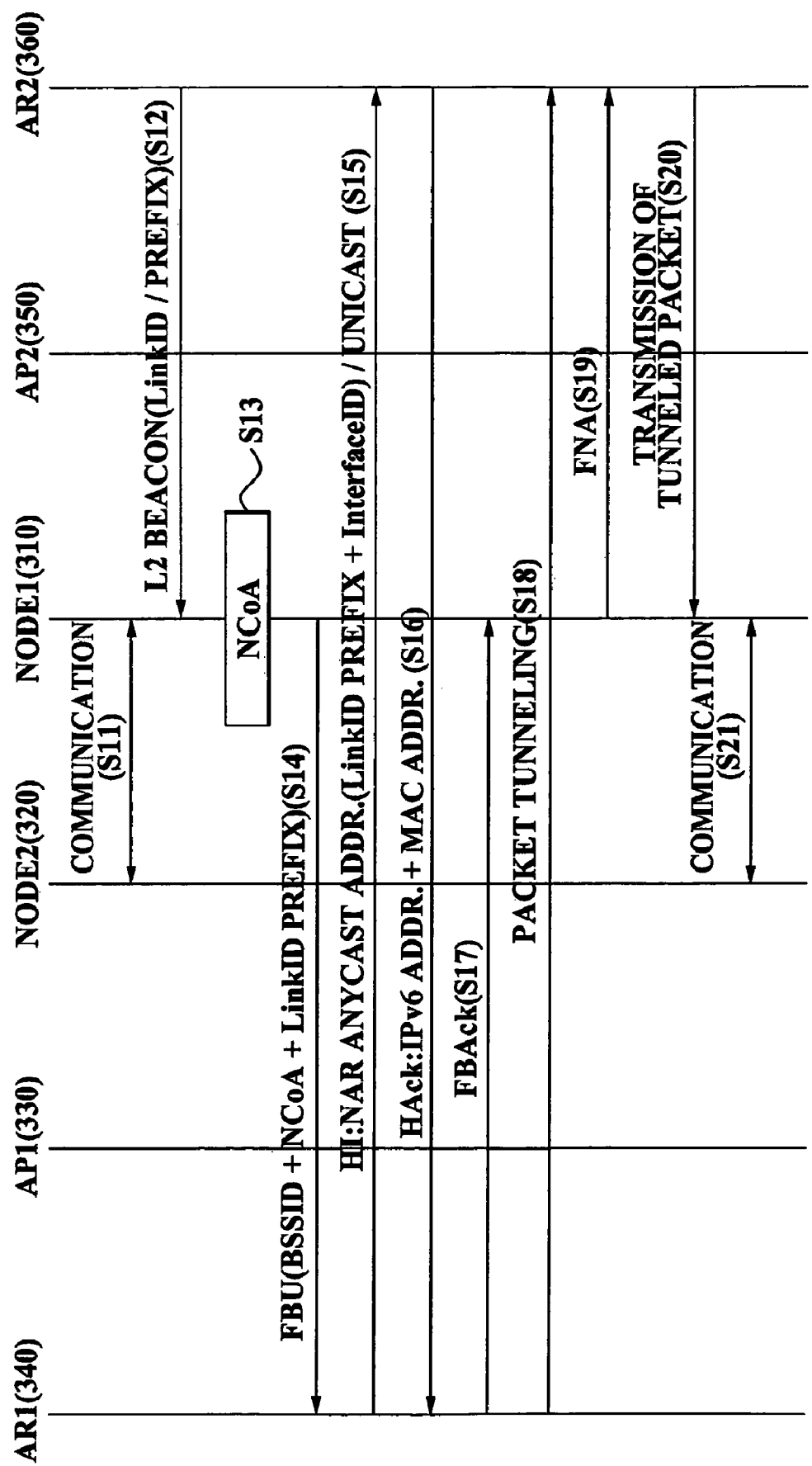
FIG. 4 is a flowchart illustrating a process of operating a wireless communication system according to an exemplary embodiment of the present invention.

Hereinafter, operations of the wireless communication system 300 according to an exemplary embodiment of the present invention will be described with reference to FIG. 4.

In step S11, the first node 310 of FIG. 3 performs a communication service, such as a call with the second node 320, via the first AP 330. In an exemplary implementation, an assumption is made that operations of the first node 310 for the call will be similar to operations when the first node 310 performs a communication service, such as downloading/uploading of digital media data which is sent from an application server.

While the first node 310 communicates with the second node 320, the first node 310 moves to a boundary between a service coverage area of the first AP 330 and a service coverage area of the second AP 350. Also, the first node 310 attempts a handoff to a subnet of the second AR 360.

In step S12, the second AR 360 which is connected to the second AP 350 sends an L2 beacon which includes a LinkID prefix, to perform the handoff. The L2 beacon generally includes an access point Media Access Control (AP MAC) address or a Basic Service Set Identifier (BSSID). In an exemplary embodiment of the present invention, the LinkID prefix is included in the L2 beacon for fast dynamic handoff.

Figure 5:
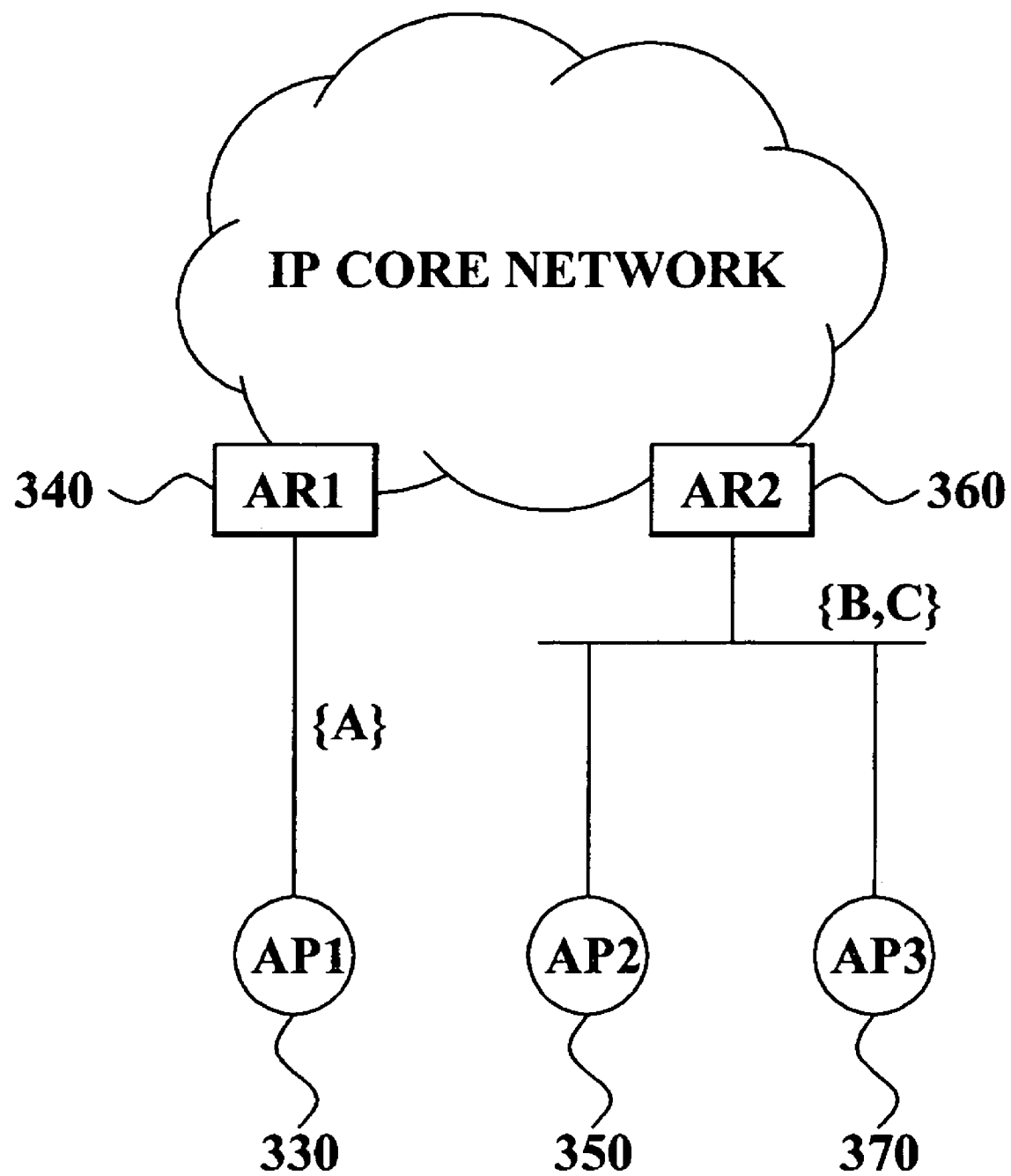
FIG. 5 is a diagram illustrating an example of a network for managing a set of prefixes of access routers according to an exemplary embodiment of the present invention.

As illustrated in FIG. 5, the first AR 340 and the second AR 360 manage a set of prefixes to be allocated to corresponding APs which are attached to the first AR 340 and the second AR 360. For example, the first AR 340 manages a set {A}, and the second AR 360 manages a set {B, C}. However, a prefix with a smallest value is selected as a LinkID prefix of a corresponding AR from a list of prefixes. For example, the first AR 340 may select a prefix A as the LinkID prefix. Also, the second AR 360 may select the prefix B as the LinkID prefix. FIG. 6 illustrates each LinkID number assigned to each AP. A dynamic access router table, which is a mapping information table with respect to the LinkID prefixes selected by each of the first AR 340 and the second AR 360, may be managed in each of the first AR 340 and the second AR 360. Here, 'dynamic' designates that, even when a corresponding entry is not included in the access router table, each of the first AR 340 and the second AR 360 may dynamically construct a new entry as a mobile node (MN) sends a LinkID prefix, which will be described later.

The L2 beacon may be inserted into a Router Advertisement (RA) message, and sent by the second AR 360. In step S13, the first node 310 receives the L2 beacon, extracts the LinkID prefix from the L2 beacon, and dynamically constructs a new care of address (NCoA). A conventional CoA is a temporary address which is randomly generated in FMIPv6, and announces current location information. However, in an exemplary embodiment of the present invention, the NCoA is dynamically constructed by combining the LinkID prefix.

In step S14, the first node 310 sends a Fast Binding Update (FBU) message including the NCoA, and the first AR 340 prepares to establish a tunneling with the second AR 360. The FBU message includes the LinkID prefix, and the BSSID which is acquired from the L2 beacon.

In step S15, the first AR 340, which receives the FBU message, constructs a unicast address for handoff initialization (HI) according to an entry corresponding to the LinkID prefix, and sends a unicast message to the second AR 360, when the entry is included in a router access table of the first AR 340.

However, the first AR 340, which receives the FBU message, dynamically adds an entry corresponding to the LinkID prefix to a router access table, and manages the router access table, when the entry is not included in the router access table of the first access router 340. According to an exemplary implementation, the entry corresponding to the LinkID prefix does not include L3 information about an AR and thus, is not complete. Accordingly, in step S15, the first AR 340 constructs an anycast address for handoff initialization using the LinkID prefix, and sends the anycast message to the second AR 360. The anycast message includes a 'well-known' interface ID in addition to the LinkID prefix. In step S16, the second AR 360 sends a handoff acknowledgement (HAck) message, which includes an IPv6 address and a MAC address of the second AR 360, to the first AR 340. According to another exemplary implementation, the first AR 340 adds L3 information about the second AR 360, which has sent the HAck message, to an entry corresponding to the LinkID prefix, and completes the access router table of the first AR 340.

In step S17, the first AR 340 sends a Fast Binding Acknowledgement (FBAck) message including the IPv6 address and the MAC address of the second AR 360. After establishing the tunneling between the first AR 340 and the second AR 360, the first AR 340 starts transferring IP packets which are received from an upper layer, to the second AR 360 in step S18.

After establishing the tunneling, when the first node 310 sends a Fast Neighbor Advertisement (FNA) message from the service coverage area of the second AP 350 in step S19, the IP packet which is sent from the first AR 340 to the second AR 360 and buffered, may be sent from the second AR 360 to the first node 310 in step S20. Accordingly, in step S21, the first node 310 may continuously communicate with the second node 320, which is a correspondent node, in the service coverage area of the second AP 350, a location which is moved from the service coverage area of the first AP 330 under the subnet of the first AR 340.

In the wireless communication system 300 described above, the LinkID prefix is inserted into the L2 beacon and sent. Accordingly, each MN or each AR may dynamically acquire information which is necessary for handoff. Also, each AR may dynamically manage the access router table without a separate configuration procedure. Specifically, when an entry is not included in the access router table, each AR may dynamically add mapping information to the access router table according to the LinkID prefix which is received from the mobile node, and thereby, support handoff of FMIPv6.

Hereinafter, specific features that facilitate simplification and effective processing of L3 handoff procedures will be described with reference to FIGS. 7 through 9.

Figure 7:
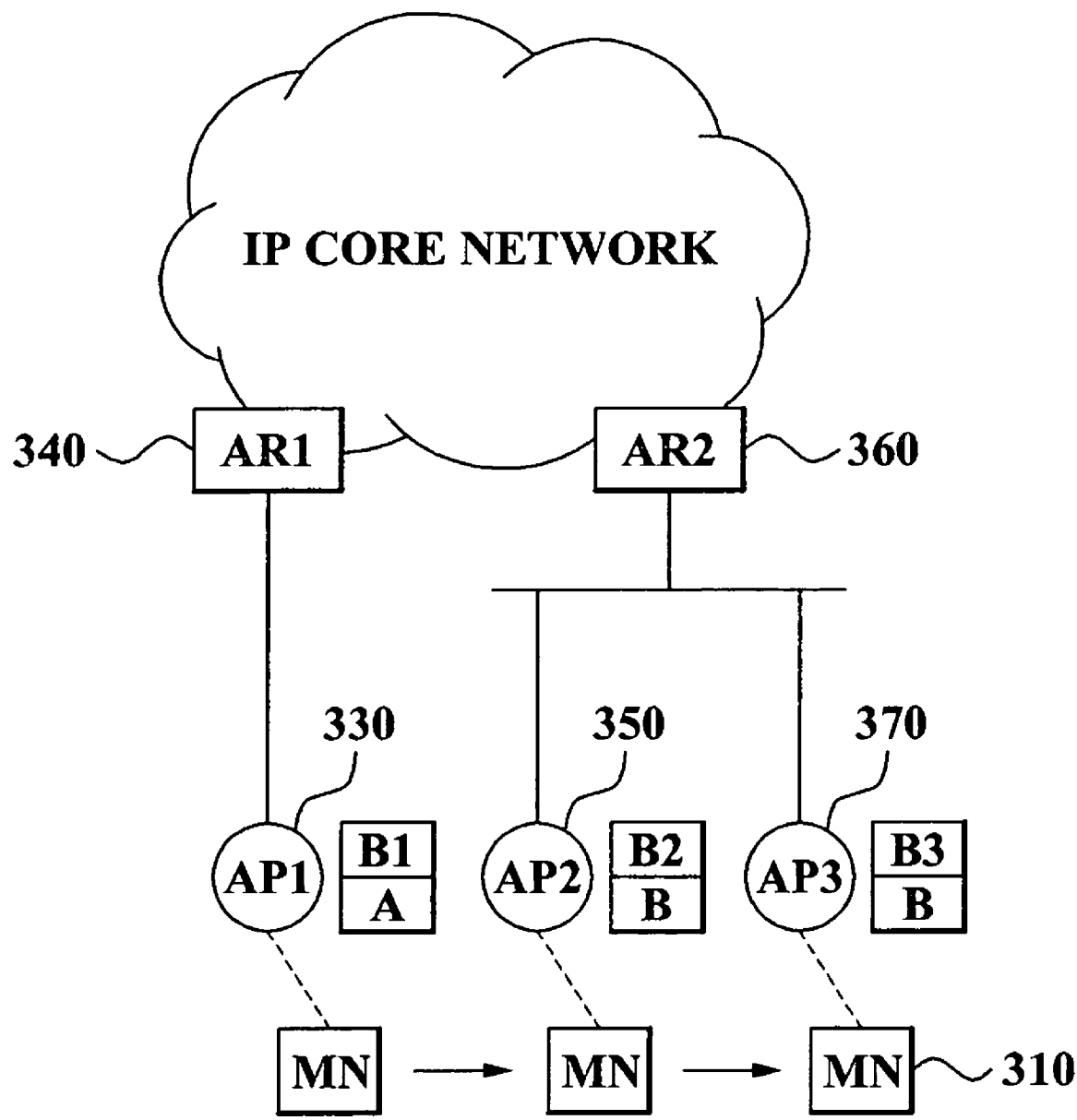
FIG. 7 is a diagram illustrating an example of a network for explaining an L3 handoff of a mobile node according to an exemplary embodiment of the present invention.

FIG. 7 is a diagram illustrating an example of a network for explaining a Layer 3 (L3) handoff of a MN according to an exemplary embodiment of the present invention. In FIG. 7, when a mobile node 310 receives an L2 beacon which is sent from any one of a first AR 340 and a second AR 360, a determination is made as to whether an L3 handoff should be performed, according to the LinkID prefix which is included in the L2 beacon.

Specifically, in FIG. 7, a first AP 330 is connected to the first AR 340, and a second AP 350 and a third AP 370 are connected to the second AR 360. The MN 310 receives the L2 beacon B1 including the LinkID prefix A, and is attached to the first AP 330 to communicate with a correspondent node, in the service coverage area of the first AP 330 under the subnet of the first AR 340.

When the MN 310 moves to the service coverage area of the second AP 350 under the subnet of the neighboring second AR 360, the MN 310 receives a L2 beacon B2 including a LinkID prefix B. According to an exemplary implementation, the MN 310 may be attached to the second AP 350 since the additionally received LinkID prefix B is different from a previous LinkID prefix A. The MN 310 may then communicate with the correspondent node by performing the L3 handoff procedure according to the operations shown in FIG. 4.

However, when the MN 310 moves again to the service coverage area of the neighboring third AP 370, the MN 310 receives an L3 beacon B3 including the LinkID prefix B. In an exemplary implementation, the MN 310 is attached to the third AP 370 without performing the L3 handoff procedure according to the operations shown in FIG. 4, and communicates with the correspondent node, while receiving an IP packet from the second AR 360.

Figure 8:
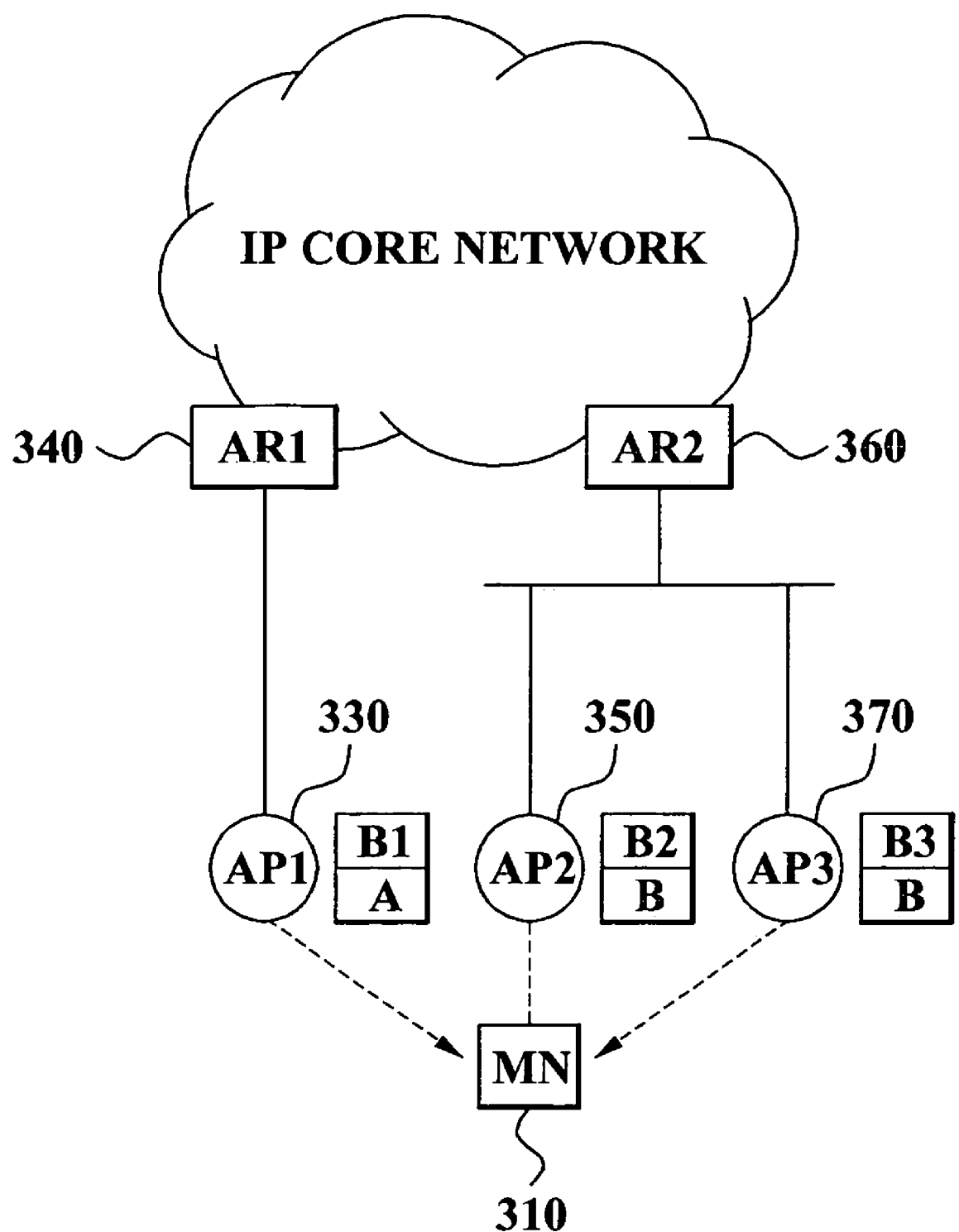
FIG. 8 is a diagram illustrating an example of a network for explaining a mobile node's failure to perform an L3 handoff in an identical subnet according to an exemplary embodiment of the present invention.

FIG. 8 is a diagram illustrating an example of a network for explaining a mobile node's failure to perform an L3 handoff in an identical subnet according to an exemplary embodiment of the present invention.

When the MN 310 is attached to the second AP 350 and communicates with a correspondent node in the service coverage area of the second AP 350 that is under the subnet of the second AR 360, the MN 310 may receive a plurality of L2 beacons from the neighboring first AP 330 and the third AP 370. By the time the MN 310 is attached to the second AP 350, the MN 310 has already received an L2 beacon B2 which includes a LinkID prefix B.

In an exemplary implementation, the MN 310 compares LinkID prefixes A and B which are included in the received plurality of L2 beacons, with a value B which is maintained in the previous communication. Based on the comparison, the MN 310 may determine that the service coverage areas of the second AP 350 and the third AP 370 is under the identical subnet of the second AR 360. Also, the MN 310 may determine that the service coverage areas of the first AP 330 and the third AP 370 are under different subnets. Based on assumptions that other conditions are identical, the MN 310 selects the third AP 370. The third AP 370 has sent the L2 beacon including the value B that is identical to the maintained value in the previous communication, of the LinkID prefixes A and B, and communicates with the third AP 370. Since the handoff to the first AP 330 includes the L3 handoff shown in FIG. 4 and also requires signaling with the first AR 340 and the second AR 360, the handoff to the third AP 370 may avoid this overhead.

As described with reference to FIGS. 7 and 8, in the handoff method according to an exemplary embodiment of the present invention, FMIPv6 is operated without unnecessary signaling such as a Router Solicitation (RS) message or a Router Advertisement (RA) message. Accordingly, an AP which requires less overhead for attachment may be easily detected and thereby, a handoff to the AP may be performed.

Figure 9:
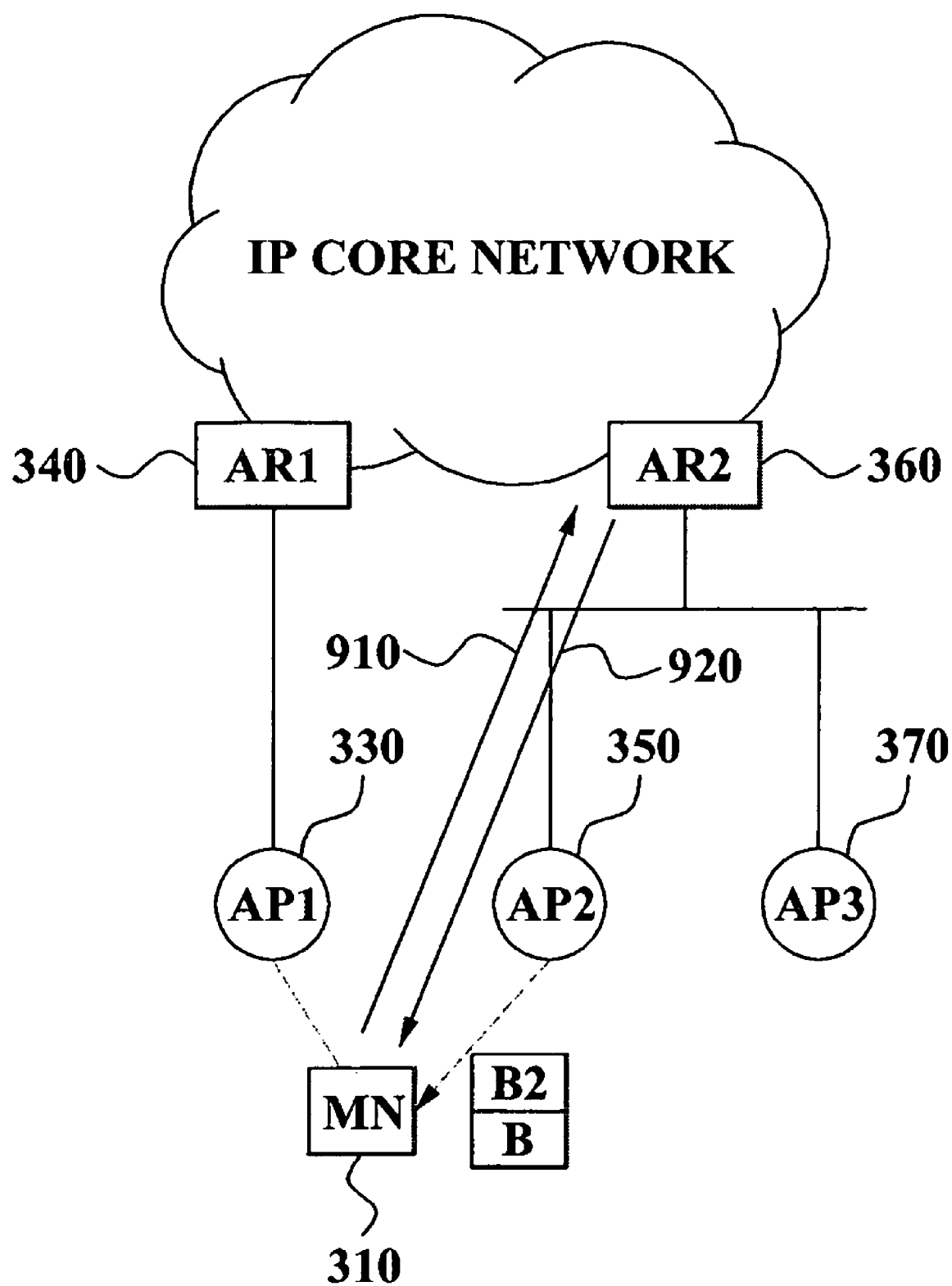
FIG. 9 is a diagram illustrating an example of a network for explaining when a mobile node directly acquires L3 information from a new access router according to an exemplary embodiment of the present invention.

FIG. 9 is a diagram illustrating an example of a network for explaining when a MN directly acquires L3 information from a new access router according to an exemplary embodiment of the present invention.

In FIG. 9, when the MN 310 moves to the service coverage area of the second AP 350 that is under the subnet of the second AR 360 while still attached to the first AP 330 in the service coverage area of the first AP 330 that is under the subnet of the first AR 340 and communicating with the correspondent node, the MN 310 receives the L2 beacon B2 including the LinkID prefix B.

According to an exemplary implementation, the MN 310 may construct a 'new access router (NAR) Address Discovery Request message' 910, to directly request the second AR 360 for L3 information. The 'NAR Address Discovery Request message' 910 is an anycast type message using an anycast address with the LinkID prefix. As described in step S15 of FIG. 4, the anycast address includes a 'well-known' interface ID in addition to the LinkID prefix. In steps S14 and S15 of FIG. 4, the FBU message and the handoff initialization (HI) message are respectively generated in the MN 310 and the first AR 340, but the 'NAR Address Discovery Request message' 910 designates a message that the MN 310 directly requests the second AR 360 for L3 information.

One of the ARs for an additional link, such as, the second AR 360 which is connected to the second AP 350, receives the 'NAR Address Discovery Request message' 910. In response to the 'NAR Address Discovery Request message' 910, the second AR 360 constructs a 'NAR Address Discovery Reply message' 920, to send, L3 information of the second AR 360 to the MN 310. The 'NAR Address Discovery Reply message' 920 includes the IPv6 address and the MAC address of the second AR 360 which is similar to a handoff reply message in step S16 of FIG. 7. In steps S16 and S17 of FIG. 4, the FBAck message and the HAck message are generated respectively in the first AR 340 and the second AR 360, but the 'NAR Address Discovery Reply message' 920 indicates a message that the MN 310 directly receives L3 information from the second AR 360.

Accordingly, the MN 310 manages the L3 information which is received from the second AR 360, and thereby, facilitates the simplification and effective processing of the L3 handoff procedure shown in FIGS. 7 and 9. Also, the MN 310 includes the LinkID prefix and the L3 information in a predetermined request message, such as, a message according to a 'Dynamic NAR Address Discovery Protocol'. The message is sent to the first AR 340, so that the first AR 340 may dynamically add a new entry to the access router table.

As described above, a MN may directly acquire L3 information such as an IPv6 address and a MAC address of an AR without an intermediate agent. Accordingly, an L3 handoff procedure of FMIPv6 may be simplified, and effectively and continuously performed.

According to an exemplary embodiment of the present invention, a LinkID prefix is contained in an L2 beacon and sent in a wireless communication system and handoff method. Accordingly, a MN or an AR may dynamically acquire information which is necessary for handoff.

According to an exemplary embodiment of the present invention, the MN may easily verify an appropriate AP and perform handoff to the AP since a MN may acquire L3 information without an intermediate agent. Also, an AR may dynamically manage an access router table without a separate configuration procedure.

A handoff procedure may be simplified and effectively processed by operating FMIPv6 without unnecessary signaling such as an RS message or an RA message according to an exemplary embodiment of the present invention.

Also, according to an exemplary embodiment of the present invention, even when an entry is not included in an access router table, an AR may dynamically add mapping information to the access router table according to a LinkID prefix which is received from an MN, and thereby support handoff of FMIPv6.

The invention can also be embodied as computer-readable codes on a computer-readable recording medium. The computer-readable recording medium is any data storage device that can store data which can be thereafter read by a computer system. Examples of the computer-readable recording: medium include read-only memory (ROM), random-access memory (RAM), CD-ROMs, magnetic tapes, floppy disks, optical data storage devices, and carrier waves (such as data transmission through the Internet via wired or wireless transmission paths). The computer-readable recording medium can also be distributed over network-coupled computer systems so that the computer-readable code is stored and executed in a distributed fashion. Also, functional programs, codes, and code segments for accomplishing the present invention can be easily construed as within the scope of the invention by programmers skilled in the art to which the present invention pertains.

While the present invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for performing a handoff from a first access router to a second access router in a wireless communication system, the method comprising:
    sending, by the second access router, a Layer 2 (L2) beacon containing a link identifier prefix to a mobile node; and
    establishing a tunneling between the first access router and the second access router,
    wherein:
        the mobile node sends a Fast Binding Update (FBU) message comprising a care-of address (CoA) to the first access router;
        the mobile node dynamically constructs the CoA using the link identifier prefix;
        the second access router is new to the mobile node; and
        the link identifier prefix includes an access point prefix identifying a single access point connected to the second access router, the access point prefix being an access point prefix having a smallest value among a plurality of access point prefixes corresponding to a plurality of access points connected to the second access router.

2. The method of claim 1, wherein the Fast Binding Update (FBU) message comprises the link identifier prefix, and a Basic Service Set Identifier (BSSID) which is acquired from the L2 beacon.

3. The method of claim 1, wherein the establishing of the tunneling comprises:
    constructing a unicast address for handoff initialization by the first access router according to an entry corresponding to the link identifier prefix to send a unicast message to the second access router, when a router access table of the first access router comprises the entry.

4. The method of claim 1, wherein the first access router adds an entry corresponding to the link identifier prefix to a router access table, when the router access table does not comprise the entry.

5. The method of claim 4, wherein the establishing of the tunneling comprises:
    constructing an anycast address for handoff initialization by the first access router by using the link identifier prefix to send an anycast message to the second access router.

6. The method of claim 5, further comprising:
    sending a reply message comprising an Internet Protocol version 6 (IPv6) address and a Media Access Control (MAC) address of the second access router by the second access router to the first access router, in response to the anycast message.

7. The method of claim 6, further comprising:
    sending a Fast Binding Acknowledgement (FBAck) message comprising the IPv6 address and the MAC address of the second access router by the first access router to the mobile node.

8. The method of claim 1, comprising:
    sending a Fast Neighbor Advertisement (FNA) message by the mobile node to the second access router after the establishing of the tunneling;
    receiving an Internet Protocol (IP) packet which is transferred from the first access router to the second access router, from the second access router; and
    communicating with a correspondent node.

9. A mobile detection method of a mobile node in a wireless communication system, the method comprising:
    receiving a Layer 2 (L2) beacon comprising a link identifier prefix, the L2 beacon being received by the mobile node from an access router that is new to the mobile node; and
    determining whether an L3 handoff is performed, according to the link identifier prefix, wherein the mobile node receives a plurality of L2 beacons, selects an access point which has sent an L2 beacon containing a link identifier prefix, extracted from the plurality of L2 beacons, identical to a maintained link identifier prefix in a previous communication, and communicates with the selected access point.

10. The method of claim 9, wherein the L3 handoff is performed when the link identifier prefix is a changed value, and the L3 handoff is not performed when the link identifier prefix is not the changed value.

11. The method of claim 9, wherein the mobile node receives a plurality of L2 beacons, selects an access point which has sent an L2 beacon containing a link identifier prefix; extracted from the plurality of L2 beacons, identical to a maintained link identifier prefix in a previous communication, and communicates with the selected access point.

12. The method of claim 9, further comprising:
    the mobile node constructing a New Access Router (NAR) Address Discovery Request message, to directly request the access router for L3 information.

13. The method of claim 12, wherein the NAR Address Discovery Request message comprises an anycast message using an anycast address with the link identifier prefix.

14. The method of claim 12, further comprising:
the access router constructing the NAR Address Discovery Reply message to send L3 information of the access router to the mobile node, in response to the request.

15. The method of claim 14, wherein the NAR Address Discovery Reply message comprises an IPv6 address and a MAC address of the access router.

16. A routing apparatus for performing a handoff of a mobile node in a wireless communication system, the routing apparatus comprising:
a second access router configured to send a Layer 2 (L2) beacon comprising a link identifier prefix to the mobile node, the second access router being new to the mobile node; and
a first access router configured to:
receive a Fast Binding Update (FBU) message comprising a care-of address (CoA) from the mobile node, the CoA being dynamically constructed using the link identifier prefix by the mobile node; and
establish a tunneling with the second access router according to the FBU message, wherein the link identifier prefix includes an access point prefix identifying a single access point connected to the second access router, the access point prefix being an access point prefix having a smallest value among a plurality of access point prefixes corresponding to a plurality of access points connected to the second access router.

17. The routing apparatus of claim 16, wherein the first access router adds an entry corresponding to the link identifier prefix to a router access table, when the router access table does not comprise the entry.

18. The routing apparatus of claim 17, wherein the first access router constructs an anycast address for handoff initialization using the link identifier prefix, to send an anycast message to the second access router.

19. The routing apparatus of claim 16, wherein the mobile node determines whether an L3 handoff is performed, according to the link identifier prefix.

20. The routing apparatus of claim 19, wherein the mobile node performs the L3 handoff when the link identifier prefix comprises a changed value, and does not perform the L3 handoff when the link identifier prefix does not comprise the changed value.

21. The routing apparatus of claim 19, wherein the mobile node receives a plurality of L2 beacons, selects an access point which has sent an L2 beacon containing a link identifier prefix, extracted from the plurality of L2 beacons, identical to a maintained link identifier prefix in a previous communication, and communicates with the selected access point.

22. The routing apparatus of claim 19, wherein the mobile node constructs an anycast message using an anycast address with the link identifier prefix, to directly request the second access router for L3 information.

23. The routing apparatus of claim 22, wherein the second access router constructs a reply message comprising an IPv6 address and a MAC address of the second access router and sends the L3 information of the second access router to the mobile node, in response to the request.

24. The routing apparatus of claim 16, wherein the routing apparatus supports a fast mobility Internet Protocol version 6 (FMIPv6).

25. The routing apparatus of claim 16, wherein the routing apparatus is applied to a portable Internet system according to at least one of the Institute of Electrical and Electronics Engineers (IEEE) 802.16d/e, wireless broadband Internet (WiBro), and World Interoperability for Microwave Access (WiMAX).

26. The method of claim 1, further comprising:
establishing communications between the mobile node and the first access router before the sending of the L2 beacon by the second access router.

27. The method of claim 1, wherein, before the sending of the L2 beacon by the second access router, the mobile node moves to a boundary between respective service coverage areas of the first and second access routers to attempt the handoff to a subnet of the second access router.

28. The method of claim 9, further comprising:
establishing communications between the mobile node and an other access router before the receiving of the L2 beacon by the mobile node from the access router that is new to the mobile node.

29. The method of claim 28, further comprising, before the receiving of the L2 beacon of the L2 beacon by the mobile node from the access router that is new to the mobile node:
moving to a boundary between respective service coverage areas of the other access router and the access router that is new to the mobile node to attempt a handoff to a subnet of the access router that is new to the mobile node.

30. The routing apparatus of claim 16, wherein the first access router is further configured to communicate with the mobile node before the sending of the L2 beacon by the second access router.

31. The routing apparatus of claim 16, wherein, before the sending of the L2 beacon by the second access router, the mobile node moves to a boundary between respective service coverage areas of the first and second access routers to attempt the handoff to a subnet of the second access router.

32. The method of claim 1, wherein the mobile node obtains the link identifier prefix used in constructing the CoA from the Layer 2 (L2) beacon sent by the second access router.

33. The method of claim 16, wherein the mobile node obtains the link identifier prefix used in constructing the CoA from the Layer 2 (L2) beacon sent by the second access router.

* * * * *